United States Patent
Jorgensen

(10) Patent No.: US 7,128,087 B2
(45) Date of Patent: Oct. 31, 2006

(54) DIFFERENTIAL PRESSURE VALVE

(76) Inventor: Ole Jorgensen, Holbergsgade 4, Slagelse (DK) DK-4200

( * ) Notice: Subject to any disclaimer, the term of this patent is extended or adjusted under 35 U.S.C. 154(b) by 303 days.

(21) Appl. No.: 10/491,316

(22) PCT Filed: Oct. 25, 2002

(86) PCT No.: PCT/DK02/00710

§ 371 (c)(1),
(2), (4) Date: Apr. 12, 2004

(87) PCT Pub. No.: WO03/036143

PCT Pub. Date: May 1, 2003

(65) Prior Publication Data

US 2005/0121082 A1  Jun. 9, 2005

(30) Foreign Application Priority Data

Oct. 25, 2001 (DK) ............... 2001 01568

(51) Int. Cl.
*G05D 7/01* (2006.01)
(52) U.S. Cl. .................................... 137/504
(58) Field of Classification Search ............ 137/498, 137/500, 501, 502, 503, 504
See application file for complete search history.

(56) References Cited

U.S. PATENT DOCUMENTS

| | | | |
|---|---|---|---|
| 2,950,733 A | * | 8/1960 | Perkins .................. 137/504 |
| 3,422,842 A | | 11/1966 | Erickson |
| 3,752,184 A | | 8/1973 | Griswold |
| 4,098,285 A | * | 7/1978 | Karing .................. 137/501 |
| 4,648,424 A | | 3/1987 | Takahashi et al. |
| 5,127,431 A | | 7/1992 | Credle, Jr. |

FOREIGN PATENT DOCUMENTS

DK 171285 B1 8/1996

* cited by examiner

Primary Examiner—Stephen M. Hepperle

(57) ABSTRACT

A regulating insert for insertion in a valve housing or the like in a flowing medium, comprising comprises a pre-setting means for regulation and/or setting of amounts of liquid in installations with flowing media for the limitation of the medium to a pre-set maximum amount, independently of a differential pressure working across the valve. The insert further comprises a tubular regulating element which is displaceable in a housing (3) in the longitudinal direction of the regulating insert, and lies up against a spring element (13) so that upon displacement the tubular regulating element (2) respectively opens or closes a number of openings (9) in the housing (3). The tubular regulating element (2) is influenced for regulation by a membrane, where the membrane (14) is a roller membrane, the roller membrane (14) being fastened along an outer diameter to the inner side of the housing (3) and along an inner diameter is fastened to the outer surface of the regulating element (2). The resulting forces stemming from the differential pressure across the membrane (14) lie on the same cylinder surface as that which extends through a slide surface (12) between the largest diameter of the regulating element (2) and the smallest diameter of the housing (3).

8 Claims, 2 Drawing Sheets

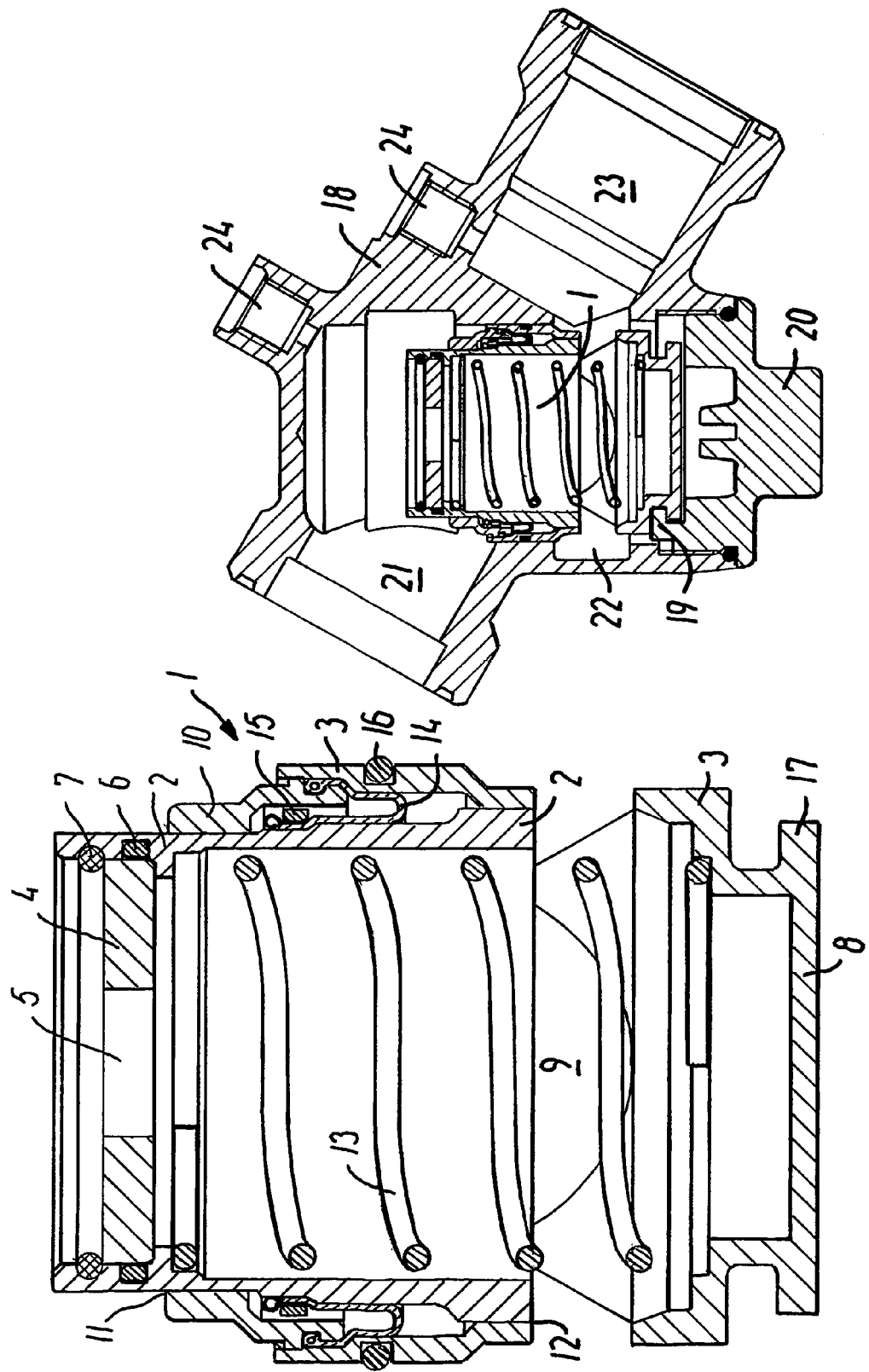

DIFFERENTIAL PRESSURE VALVE

Figure 3:
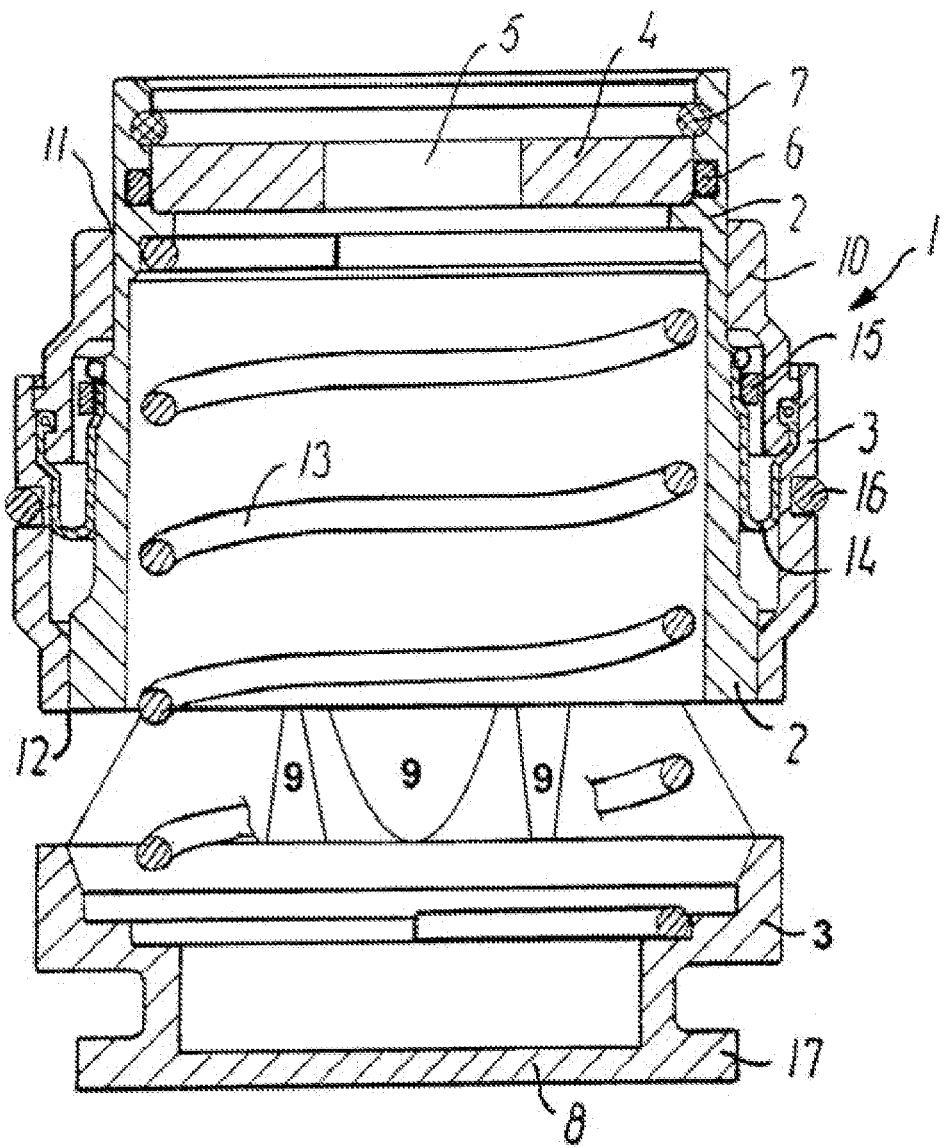

The invention relates to a regulating insert, chiefly for insertion in a valve housing or the like in a flowing medium, comprising an adjustable or replaceable pre-setting for the regulation and/or setting of the amounts of liquid in plants with flowing media for limiting the flow of the medium to a pre-set maximum amount, independently of a differential pressure working across the valve, said insert further comprising a tubular regulating element which is displaceable in a housing in the longitudinal direction of the regulating insert and lies up against a spring element, so that when displaced the tubular regulating element opens or respectively closes a number of openings along the circumference of the housing, said tubular regulating element being influenced by a membrane to effect regulation.

Regulation valves of various constructions are already known for insertion in valve housings in a flowing medium for various purposes. For example, a regulation valve is known from U.S. Pat. No. 3,422,842, where a stiff regulating element covers or uncovers openings in an outer housing. The regulating element is moved by pressure on a membrane which is placed between housing and element in such a manner that the centre portion of the membrane is fastened to the regulating element, and the outer part of the membrane is fastened to the valve housing. This valve has a pre-setting which works by a spring being compressed by means of an adjustment screw, whereby the spring pressure constitutes a counter-pressure to the pressure from the medium flowing in the valve.

This type of pre-setting suffers the disadvantage that greater forces are needed at greater flows, said forces of necessity being a loss for the pump. At greater spring forces from the pre-setting, the pump must thus be supplied with a greater amount of energy in order for the regulating insert to regulate in the normal manner.

In, for example, central heating installations, which is one of the places where use is made of valves of such a type, valves for the regulation of the heating are to be found in different rooms. For that matter, cooling in connection with air conditioning can also be involved. Upon operation of these valves, or where these valves regulate in one or more of the rooms, the pressure in the whole of the plant is changed, which makes it desirable to have a self-regulating valve inserted in the circuit.

A preferred embodiment of a regulation valve according to the invention will have a pre-setting of the flow through the valve, said embodiment comprising a replaceable disk with an aperture, where the aperture is adapted to a certain desired flow. If another flow through the valve is desired, a presetting in the form a disk with an aperture is inserted which allows precisely that amount of flow which is desired through the valve.

In the outflow end of the regulating insert a number of openings are formed with a configuration which, together with a regulating element which by its configuration together with a housing, a roller membrane and a guide part, renders it possible for the regulating insert to effect a precise regulation over a wide range of differential pressure.

It is not sufficient, however, to be able to effect a precise regulation. It is also important to avoid unnecessary hunting of the regulating element in relation to the housing. In this manner, a more stable regulation of the flow which passes through the regulating insert is achieved.

This is achieved by the membrane being a roller membrane, said roller membrane being fastened along an outer diameter to the inner surface of the housing, and fastened along an inner diameter to the outer surface of the regulating element, so that the resulting forces which arise from the differential pressure across the membrane lie on the same cylinder surface which extends through a slide surface between the greatest diameter of the regulating element and the smallest diameter of the housing.

This is achieved by the greatest diameter of the regulating element being larger than the smallest diameter of the roller membrane, and by the smallest diameter of the housing being smaller than the greatest diameter of the roller membrane. The slide surface between the greatest diameter of the regulating element and the smallest diameter of the housing will thus have a diameter which comes to lie in the interval between the greatest and smallest diameter of the roller membrane.

The openings which are in the housing, and which are intended to be opened or closed by the regulating element, can be configured as holes with identical or different diameters, or as slots of identical or different lengths.

By configuring the openings as described, it is possible to adjust the stroke length of the regulating element so that greater accuracy of regulation is achieved, and also that the risk of hunting by the regulating element is reduced.

The openings which are in the housing, and which are intended to be opened or closed by the regulating element, can be configured as round openings of different sizes or as elongated openings, for example formed as slots. These slots can advantageously be formed in such a manner that they have decreasing or increasing cross-section in the direction of flow. Finally, the openings in the housing can consist of a distribution of openings with decreasing and increasing cross-sections, respectively, possibly together with ordinary, elongated openings along the circumference of the housing.

By having these openings with different sizes it is achieved that the regulation of the flow itself assumes a far more even course of fluctuation or regulation, independently of the differential pressure, since otherwise there is the risk that the regulating element hunts forwards and backwards due to the changes in pressure which would otherwise arise, in that the regulating element then begins to open or close these openings over a distance which is too short to achieve an even regulation.

This hunting of the regulating element during regulation is also damped by creating a slot between the regulating element and the guide for said element, through which slot the medium can flow either to reach the cavity over the membrane or to leave the cavity over the membrane, all depending on whether the regulating element is on its way to open or to close for the flow. The damping can be increased or reduced by increasing or reducing the slot between the regulating element and the guide for the regulating element.

THE DRAWING

In the following, preferred embodiments of the invention will be described with reference to the drawings, where FIG. 1 shows a regulating insert according to the invention seen in section, FIG. 2 shows a regulating insert mounted in a valve housing seen in section, and FIG. 3 shows various embodiments of the outlet openings 9.

In the following there is described a preferred embodiment of a regulation valve in the form of a regulating insert 1 for insertion in a form of valve housing in a pipe in a pipeline installation, which valve is intended to regulate a medium flowing through the installation, where the regulation valve or regulating insert 1 comprises a regulating element in the form of a tubular element 2 which is placed in a displaceable manner in a housing 3. Preferably in that end which faces contra to the direction of flow, the housing 3 can be provided with a form of pre-setting or disk, and by replacement of the disk and a choice between several disk apertures it can be ensured that a certain flow through the valve is achieved.

The tubular element 2 is formed more or less as a cylinder which at its lower end is provided with a larger material thickness, so that the lowermost part of the outer diameter of the tubular element 2 is greater than the outer diameter of the remaining outer side of the tubular element 2.

In the upper part of the tubular element 2 or regulating element a pre-setting is placed which can have various expedient configurations, but which in its simplest form consists of a replaceable disk 4 with a fixed aperture 5. By placing a disk 4 in the regulating element, said disk 4 having an aperture 5 corresponding to a predetermined flow, the regulating insert 1 is thus adapted for a certain flow in a system in which the regulation is to take place. The disk 4 lies up against a projection on the inner part of the regulating element at that end of the regulating element 2 which faces contra to the direction of flow, and with its outer side the disk 4 can tighten against the regulation element 2 with a seal 6. The disk 4 is secured by a locking ring 7 or the like. If another flow through the valve 1 is desired, a pre-setting in the form of a disk 4 with an aperture 5 is inserted which is appropriate for precisely that amount of flow which is desired through the valve 1.

The regulating element 2 is moved in a housing 3, said housing 3 having a bottom part 8 from which the sides of the housing 3 extend in a direction contra to the flow direction and surround the lower part of the regulating element 2. Between the upper part of the housing 3 and the bottom part 8 of the housing 3, a number of openings 9 are placed along the periphery of the housing 3, through which openings 9 the flowing medium flows out of the valve. The upper part of the housing 3 is connected to a guide part 10 which, together with the housing 3, forms slide surfaces 11, 12 for a stable movement of the regulating element 2 in the housing 3 and in the guide part 10, respectively. The guide part 10 also forms a stop for the regulating element 2, so that the regulating element is not pressed out of the housing 3. A spring element 13 works between the housing 3 and the regulating element 2 in such a manner that the spring force from this spring element works in a direction against the direction of flow, whereby the regulation element 2 can assume a kind of balance.

At the slide surfaces 11, 12, a small amount of liquid can pass between the guide part 10 and regulating element 2, and between the housing 3 and the regulating element 2. With the construction of such a valve, by increasing or reducing the slot which is formed by the upper slide surface 11 it is possible to adjust the damping of the regulating element 2. This can possibly also be done by replacing the guide part 10, thus hereby changing the inner diameter in the upper part of the guide part 10 which constitutes the upper slide surface 11. On the regulating element 2, between the areas where the slide surfaces 11, 12 support the regulating element 2, the one end of a roller membrane 14 is fastened. The fastening can be effected with a form of clamping ring 15 or, for example, by means of a number of punctiform securing elements arranged along the periphery of the roller membrane 14 on the outside of the regulating element 2. The other end of the roller membrane 14 is secured between the housing 3 and the guide part 10. That amount of water which finds access in between the regulating element 2 and the guide part 10 at the upper slide surface 11, exerts a pressure on the upper side of the membrane 14, said pressure stemming from the pressure in the medium before the aperture 5 in the disk 4, and exerts a force on the regulating element 2 in the direction of flow. The spring force and the force stemming from the pressure after the aperture 5 in the disk 4, working on the greatest diameter of the regulating element 2, exerts a pressure in the opposite direction, which creates a constant difference in pressure across the aperture 5 in the disk 4, whereby a constant flow is maintained.

In order to ensure that the flow through the valve 1 does not run around the housing 3, the housing 3 is provided along its periphery with a seal 16 for sealing against a wall in a valve housing 18. The bottom part 8 of the housing 3 is provided with an annular projection 17 along that edge of the bottom part 8 which faces away from the housing 3. This edge 17 serves as a securing flange in a corresponding recess 19 in a plug part 20.

FIG. 2 shows a valve housing 18 which as a unit is intended to be built into a pipeline in a heating or cooling installation. The valve housing 18 has an inlet with a cylindrical cavity 21 which is connected to an outlet 23 by means of a channel 22, in which channel 22 an insert or regulating insert 1 is placed. The channel 22, which accommodates the regulating insert 1, is provided in that end which faces away from the inlet 21 and the outlet 23 with a closure in the form of a plug part 20 which can be opened for insertion of the regulating insert 1. In the valve housing 18 there can be further openings 24 which are closed in the operating situation.

The flowing medium is led to the valve and into the cylindrical cavity 21 where the medium meets the upper part of the assembled insert 1, which comprises an internal, tubular regulating element or piston 2 with round cross-section, and an external, cup-shaped housing 3, said housing 3 having a number of openings 9 disposed along the periphery of the lower part of the housing 3.

When the valve insert 1 is to be inserted in the valve housing 18, the bottom part 8 of the insert 1 is brought into engagement with a projecting part 19 on a plug part 20, said projecting part 19 gripping around an edge 17 on the bottom part 8 of the insert and surrounding this edge 17 along a part of the periphery of the bottom part 8, this part being smaller or equal to a half part of the periphery.

By using a disk-shaped part as pre-setting 4, a regulating element 2 of short extent is achieved. By making use of this embodiment, some distinctly smaller dimensions for the building-in of the regulating insert 1 are achieved, which also places less restrictive demands regarding the size of the valve housing 18 in which the regulating insert 1 can be inserted.

The regulating insert 1 can also be inserted directly into a straight piece of piping. In this case the pipe piece is of such a dimension that it is possible for the flowing medium to pass between the inner wall of the pipe piece and the outer periphery of the regulating insert. Between the inner side of the pipe piece and the outer side of the regulating insert 1, a commonly-known form of seal 16 is placed so that the flowing medium is not allowed passage without passing through the regulating insert 1.

The regulating insert 1 is divided into three main components: A housing 3, a regulating element in the form of a tubular element 2, and a pre-setting 4. Placed between a bottom in the housing 3 and the regulating element 2 there is a spring element 13 (shown in FIG. 1), which presses the regulating element 2 contra to the flow direction, and thus works opposite to the pressure from the flowing medium. Placed between the housing 3 and the regulating element 2, i.e. between the upper part of the housing 3 and an area on the cylindrical surface of the regulating element 2, there is a roller membrane 14 which forms a separation between the pressure outside (before) the valve and the pressure inside the valve (in the regulating element 2, after the pre-setting 4).

From FIG. 1 it will be understood that a medium from the area immediately before the pre-setting 4 will press against the working area provided by the membrane 14 in the housing 3, and hereby through the regulating element 2 press the spring element 13 together, so that the open edge of the regulating element 2 will gradually close the outlet openings 9 formed in the housing 3.

As a rule, and for reasons of a technical nature, in a calculation of the forces which work across the membrane 14 the mean diameter of the roller membrane 14 is taken into account, which can be expressed as half of the sum of the largest diameter of the roller membrane and the smallest diameter of the roller membrane, but in practice the forces work over the whole "pocket" of the roller membrane 14, which consists of that part of the roller membrane 14 which extends between the housing 3 and the regulating element 2.

In order to ensure a constant flow at increasing differential pressure, in addition to changing the spring characteristic for the spring element 13 and the aperture 5, it is also possible in the manufacture of the valve to take into account the piston area of the regulating element 2, and in this manner produce a valve with an even course of fluctuation and a constant flow at increasing differential pressure when a minimum pump pressure or operational pressure is reached.

The outlet openings 9 in the housing 3 can be configured as round openings disposed at equal intervals along the periphery in the one end of the housing. The outlet openings 9 can also be disposed so that they extend along the periphery in accordance with increasing or decreasing size.

In a preferred embodiment. as shown in FIG. 3, the outlet openings may be configured partly parabolic with the apex pointing away from the inlet opening.

In a further embodiment, also illustrated in FIG. 3, the outlet openings 9 in the housing 3 can be configured as longitudinal, slot-shaped openings with a cross-section which decreases in the direction of flow.

Moreover, as further illustrated in FIG. 3, the outlet openings 9 can have a cross-section which is increasing seen in the direction of flow at the beginning of a regulating movement of the tubular element 2, and a decreasing cross-section seen in the direction of flow at the end of the regulating movement of the tubular element 2.

In a not-shown embodiment, uniform outlet openings 9 can be formed in the housing 3, where the edge of the regulating element 2 can be formed in an irregular manner in order to avoid a too abrupt closing of the cross-section of the outlet openings 9, and herewith a partly unstable course of regulation.

The invention claimed is:

1. A regulating insert for insertion in a valve housing disposed in a flowing medium, comprising pre-setting means for regulation and/or setting an amount of flowing medium for limiting the flow of the medium to a pre-set maximum amount, independently of a differential pressure working across the valve housing, a tubular regulating element (2) which is displaceable within a housing (3) in a longitudinal direction of the regulating insert (1) and which lies up against a spring element (13), so that upon displacement, the tubular regulating element (2), via its outer edge, respectively opens or closes a number of openings (9) in the housing (3), said tubular regulating element (2) being influenced for regulation by a membrane (14), the membrane being a roller membrane (14), said roller membrane (14) fastened along an outer diameter to the inner surface of the housing (3), and fastened along an inner diameter to an outer surface of the regulating element (2), so that resulting forces provided above the preseting means form a differential pressure across the membrane (14), with a pressure inside the regulating element (2), extending through a slide surface (12) provided between the largest diameter of the regulating element (2) and the smallest diameter of the housing (3).

2. The regulating insert in accordance with claim 1 wherein a diameter of the slide surface (12) between the largest diameter of the regulating element (2) and the smallest diameter of the housing (3) corresponds to a mean diameter of the roller membrane (14).

3. The regulating insert in accordance with claim 2, wherein a diameter of the slide surface (12) between the largest diameter of the regulating element (2) and the smallest diameter of the housing (3) is greater than the mean of the roller membrane (14).

4. The regulating insert in accordance with claim 1, wherein a diameter of the slide surface (12) between the largest diameter of the regulating element (2) and the smallest diameter of the housing (3) is less than a mean diameter of the roller membrane (14).

5. The regulating insert in accordance with claim 1 wherein the housing (3) is provided with outlet openings (9) with a cross-section which decreases in the direction of flow at a beginning of a regulating movement of the tubular element (2).

6. The regulating insert in accordance with claim 1 wherein the outlet openings (9) formed in the housing (3) are round openings which are disposed along a periphery of one end of the housing.

7. The regulating insert in accordance with claim 1 wherein the outlet openings (9) formed in the housing (3) are partly parabolic with an apex pointing away from an inlet opening.

8. The regulating insert in accordance with claim 1 wherein the outlet openings (9) are of different sizes.

* * * * *

UNITED STATES PATENT AND TRADEMARK OFFICE
CERTIFICATE OF CORRECTION

| | |
|---|---|
| PATENT NO. | : 7,128,087 B2 |
| APPLICATION NO. | : 10/491316 |
| DATED | : October 31, 2006 |
| INVENTOR(S) | : Ole Jorgensen |

It is certified that error appears in the above-identified patent and that said Letters Patent is hereby corrected as shown below:

On the title page, insert:

(73) Assignee: Frese Armatur A/S, Slagelse, (DK)

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,128,087 B2  Page 1 of 1
APPLICATION NO. : 10/491316
DATED : October 31, 2006
INVENTOR(S) : Ole Jorgensen It is certified that error appears in the above-identified patent and that said Letters Patent is hereby corrected as shown below:

Title Page, Insert

(73) Assignee: Frese A/S, Slagelse, (DK)

Signed and Sealed this

Twenty-sixth Day of August, 2008

JON W. DUDAS
*Director of the United States Patent and Trademark Office*